United States Patent [19]
von Bormann

[11] Patent Number: 4,988,391
[45] Date of Patent: Jan. 29, 1991

[54] PROCESS, PLANT AND/OR APPARATUS FOR TREATING OIL-CONTAMINATED DEBRIS OR LIKE MATERIALS

[76] Inventor: Georg von Bormann, Gemsenstr. 22, D-4044 Kaarst, Fed. Rep. of Germany

[21] Appl. No.: 734,280
[22] PCT Filed: Sep. 6, 1984
[86] PCT No.: PCT/DE84/00183
 § 371 Date: May 7, 1985
 § 102(e) Date: May 7, 1985
[87] PCT Pub. No.: WO85/01069
 PCT Pub. Date: Mar. 14, 1985

[30] Foreign Application Priority Data
 Sep. 8, 1983 [DE] Fed. Rep. of Germany ... 8325846[U]
 Jun. 18, 1984 [DE] Fed. Rep. of Germany ....... 3422545

[51] Int. Cl.$^5$ ............................ C73G 1/14; B08B 3/08
[52] U.S. Cl. ..................... 134/25.5; 134/26; 134/29; 134/31; 134/40; 134/60; 134/63; 134/66; 210/242.1; 210/923
[58] Field of Search ............... 134/105, 107–109, 134/132, 11, 12, 25 R, 26, 29, 30, 31, 40, 60, 63, 65, 66; 252/156; 210/923, 242.1, 242.2, 242.3, 242.5

[56] References Cited

U.S. PATENT DOCUMENTS

| | | |
|---|---|---|
| 1,580,723 | 6/1923 | Hapgood ........................... 134/25.1 |
| 2,987,426 | 4/1961 | Shaw ..................................... 134/29 |
| 3,163,929 | 1/1965 | Goodstein ....................... 134/25.1 |
| 3,522,093 | 7/1970 | Woolman ............................. 134/29 |
| 3,715,324 | 6/1973 | Hynes ................................. 252/156 |
| 3,746,553 | 7/1973 | Anderson ........................... 134/29 |
| 4,097,306 | 6/1978 | Carman ........................... 134/25.1 |

OTHER PUBLICATIONS

*Metals Handbook*, 8th Edition, vol. 2, pp. 307–325 (1972).

*Primary Examiner*—Akok Pal
*Attorney, Agent, or Firm*—Bachman & LaPointe

[57] ABSTRACT

A process for treating oil-contaminated debris or like material in particular material to be washed such as mill scale, which is produced in industrial processes, as well as a plant and an apparatus for carrying out the process, are to be improved in such a way as to permit oil to be removed from the industrial material to be washed, in particular mill scale. For that purpose it is proposed that the oil-contaminated material, in particular the mill scale, be introduced into a washing drum and there washed in counter-flow mode in a washing lye with a pH-value of from 12 to 14, preferably 10 to 14, with the material to be washed being lifted at the wall of the drum by means of support surfaces. The washing lye is preferably mixed with about 2% of caustic soda and/or washing is at about 50° C. or a higher temperature. The plant is characterized by at least one washing drum (1a, 1b) which is supplied with washing lye (L) and which has connected downstream thereof a dewatering means (25, 26) and, downstream thereof again, a means (1c) for liquid exchange with water. For that purpose, provided at the inside surface of a closed drum wall (2) of a washing drum (1) is at least one blade (11) which is inclined with respect to the wall of the drum and which extends on a helical line (G).

8 Claims, 3 Drawing Sheets

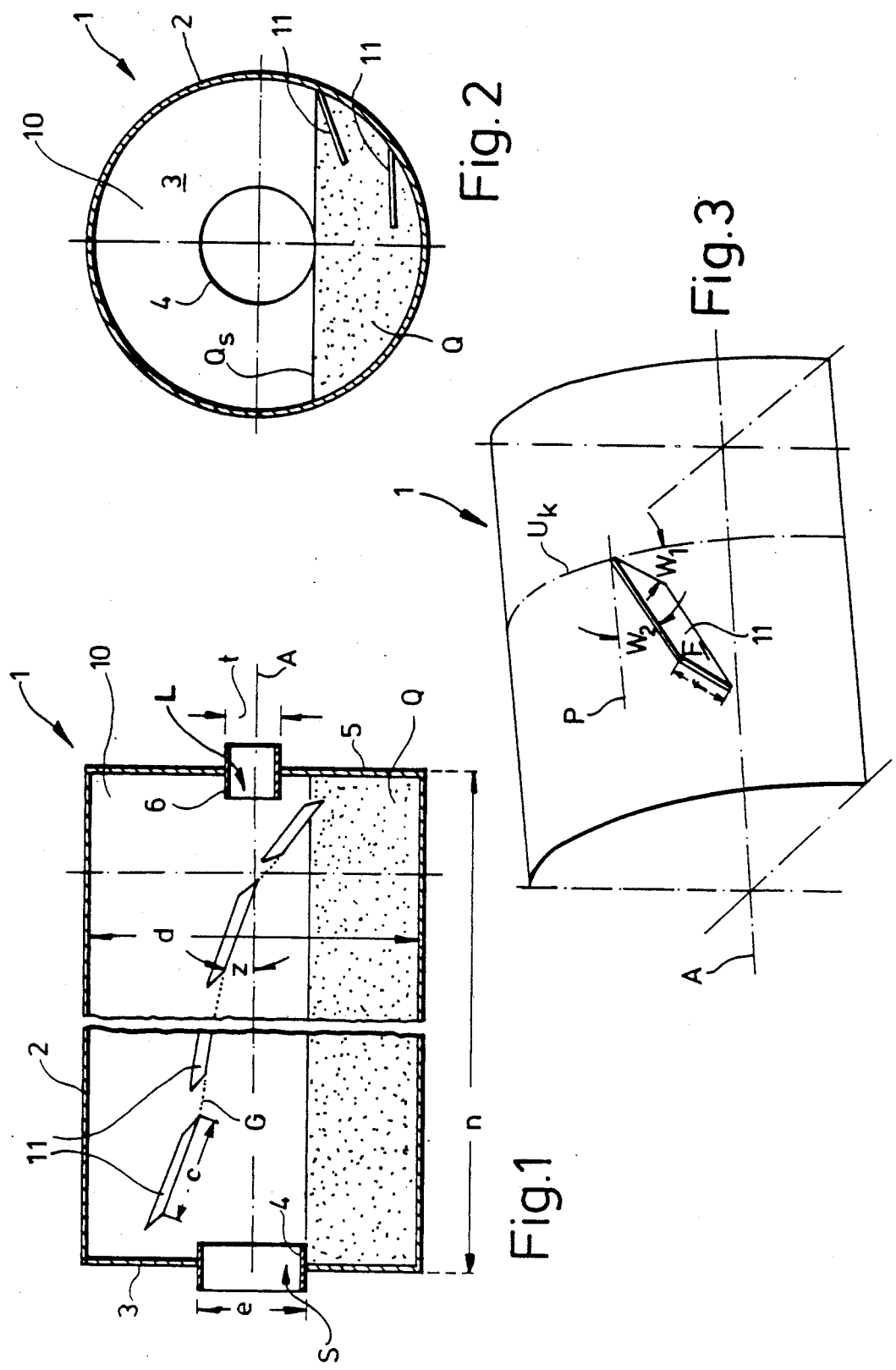

PROCESS, PLANT AND/OR APPARATUS FOR TREATING OIL-CONTAMINATED DEBRIS OR LIKE MATERIALS

The present invention relates to a process for treating oil-contaminated debris or like materials, in particular material to be washed which occurs in industrial processes such as mill scale, and a plant and/or apparatus therefor.

For the purposes of cooling large high-speed rolling mills, the rolls thereof are flooded with emulsified lubricating and cooling agents. The oil passes into the mill scale which is produced during the rolling operation and which, being charged with up to about 20% of oil, can no longer be used.

Due to the incomplete combustion of the oil, cloth filters clog and electrical filters are short-circuited by the carbon bridges which are formed and that results in filter fires or explosions.

For the stated reasons, the oil must be removed from the mill scale before it is put to use, the state of the art providing the following methods for that purpose.

The oil-contaminated mill scale is mixed with non-oil-contaminated mill scale so that the total proportion of oil falls below the harmful level. As real thorough mixing of oil-bearing and non-oil-bearing scale can hardly be carried out on a technical level, those methods still involve nests of oil, and thus give rise to the disadvantages already referred to above.

The oil-bearing mill scale may also be introduced inter alia into a downstream coke battery Due to the presence of iron, the sulphuric acid which is formed is so aggressive that the pipe systems which come into contact therewith are quickly eaten away. That means that the manufacturers of coking installations refuse any guarantee in respect thereof when oil-contaminated mill scale is intended to be used.

Problems also arise in regard to cleaning metal chips or turnings, in particular of aluminium, which have become wetted with machine oil, oil-bearing coolant or the like, for example during a cutting machining process. It is known for metal chips or turnings to be washed in a liquid If for example aluminium chips or turnings are washed in a lye, $H_2$ is produced by the reaction which occurs, with a large amount of foam being produced and an explosive mixture of hydrogen and oxygen being formed.

Having regard to the foregoing considerations, the inventor set himself the aim of so providing a process of the kind set forth in the opening part of this specification that it is possible to remove oil from industrial material to be washed, in particular mill scale. That process and the plant and/or apparatuses provided for carrying out the process are also to be such that they can be used for dealing with oil-contaminated aluminium chips or turnings or the like.

The foregoing object is achieved by way of the present invention by a process for treating oil-contaiminated debris comprising the steps of providing a drum rotatable about an axis, said drum being provided with a sidewall and opposed end walls, said opposed endwalls each having an inlet and said sidewall being provided with means for lifting the oil-contaminated debris being treated, rotating said drum about said drum axis, feeding said oil-contaminated debris through the inlet in one of said opposed endwalls, and feeding a lye washing solution having a pH of between 10 to 14 through the inlet in the other of said opposed endwalls such that said lye washing solution flows counter-current to the flow of said oil-contaminated debris and said debris is lifted by said means for lifting as said lye flows counter-current to said debris. Preferably for example the mill scale or corresponding material to be washed, being more or less of a slurry-like consistency, is introduced into a washing drum where it is washed at about 50° C. and higher in a washing lye to which 2% caustic soda is added The scope of the present invention includes a washing drum which is particularly suitable for carrying out that process and in which inclined blades are disposed at the inside surface of the closed wall of the drum, a plurality of such blades extending on a helical line, that is to say, forming a helix or spiral. According to the invention, the blades are inclined in two planes, the magnitude of the two angles of inclination depending on the slip behaviour of the material used and the desired pitch of the helical or spiral oonfiguration. The air is such an inclination that the metal chips or turnings to be cleaned, before being lifted above the surface of the washing lye by the blade, slip down and are caught by the blade which is disposed therebelow. That washing operation beneath the surface of the lye is only required when dealing with materials which undergo severe oxidation, and otherwise the material can also be lifted above the surface of the lye.

According to the invention, the washing operation is carried out in the washing drum at an elevated temperature; lower temperatures result in a considerably worse oil removal effect.

The washing lye which is discharged from the washing drum and which is charged with oil is advantageously passed into a decanter and oil removed by weans of a separator. The lye is then conducted by way of a heat exchanger and/or an evaporator, thereby generating distilled water, back to the washing drum.

It has been found desirable for those operations to be repeated at least once. In that connection, the test results set out below, using oil-contaminated mill scale, are available:
1. when washing once: reduction in the oil content from 20% to 0.23%;
2. when washing twice: reduction in the oil content from 20% oil to 0.15%.

As generally the requirement is for an oil content of less than 0.5%, the test results produced are totally adequate to be able to offer a scale which can be used again.

In accordance with the invention, after the second washing operation, the washing material from which oil has been removed is dewatered, preferably pressed or squeezed out on a chamber-type filter press and then a liquid exchange operation is carried out, with clear water, in order fully to displace the dissolved alkalis. The requirement in respect cf analysis on that aspect is as follows:

Total of the alkalis<0.3%.

By virtue of that process, the will scale is fully ready for use again.

It will be appreciated that a part of the fine mill scale is discharged with the lye and is only separated from the lye in the decanter.

The decanter produces a slurry-like deposit. The slurry is advantageously stirred into the lye and at the same time the stirred material has air blown therethrough. For that purpose, in accordance with a further feature of the invention, a stirring container is provided at its bottom with nozzles which can be selectively fed with lye or with air.

After a certain level of filling is reached, the feed of slurry to the stirring container can be interrupted and the stirrer can be switched off. The feed of air into the slurry is maintained, in accordance with the invention, so that the oil is entrained with the air bubbles as they rise through the slurry-expedited removal of oil occurs.

After some time, the feed of air is also shut off and the oil is sucked away from the surface.

Slurry which has settled at the bottom of the stirrer container is swirled up again by means of the stirrer until there is no longer any oil rising up through the slurry. The slurry is swirled up in order to reduce the start-up torque of the stirrer. The oil which has risen up through the slurry is sucked off again. That operation is controlled in dependance on the respective oil content.

When the discharge from the decanter is substantially oil-free, that material, together with the material from the washing drum, is dewatered in accordance with the invention.

The process according to the invention and the plant claimed therefor, besides being suitable for mill scale, are also suitable in accordance with the invention in particular for removing oil from metal chips or turnings, or dolomite, and likewise for removing oil from ends.

BRIEF DESCRIPTION OF DRAWINGS

Further advantages, features and details of the invention will be apparent from the following description of a preferred embodiment and with reference to the drawing in which:

FIG. 1 shows a view in longitudinal section through part of a washing drum with peripheral drum casing and end walls, FIG. 2 shows a view in cross-section through the washing drum, FIG. 3 is a diagrammatic view of a portion of the peripheral casing of the washing drum.

Figure 5:
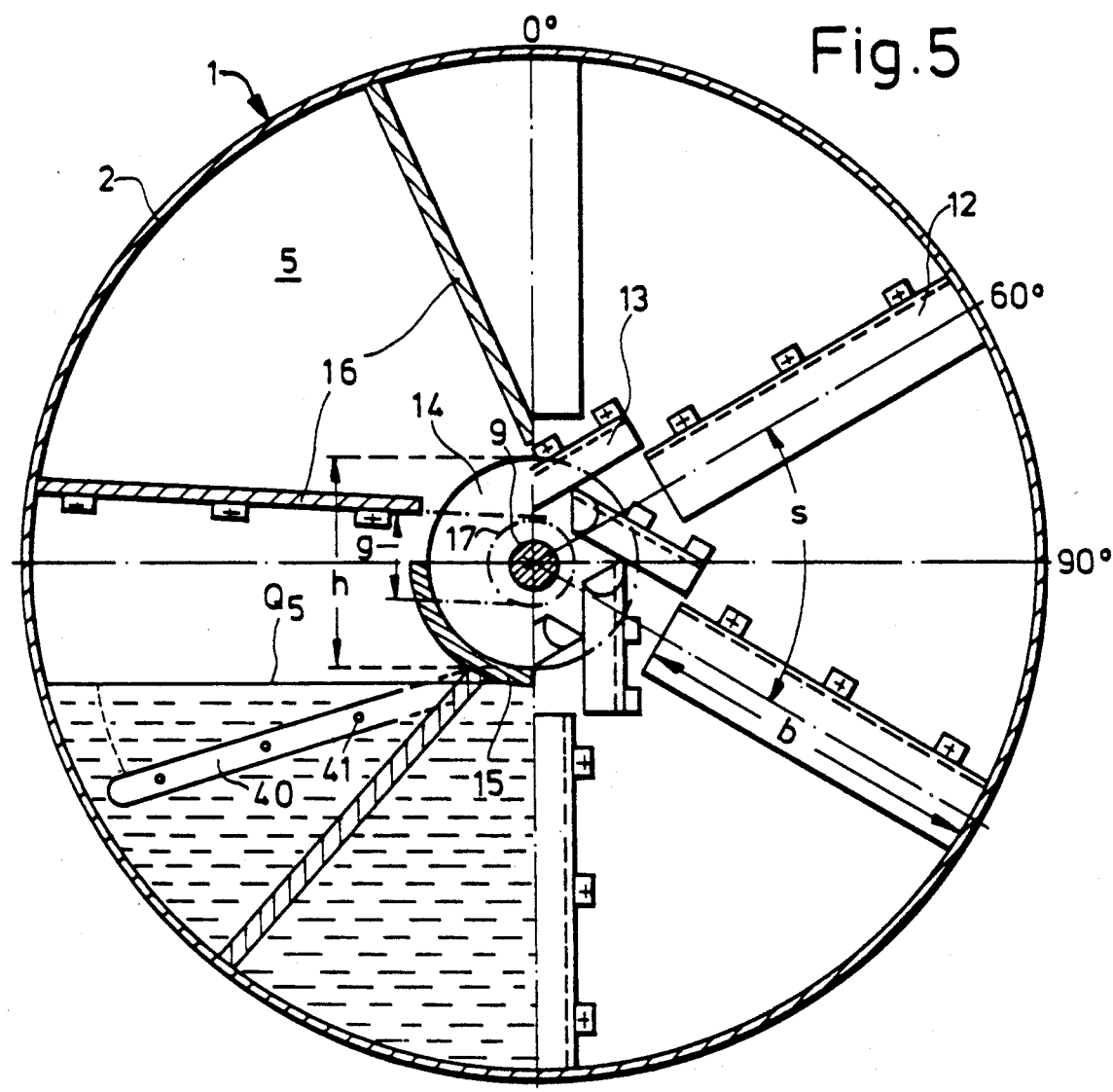
FIG. 5 is a plan view on an enlarged scale of an end wall of the washing drum.

A washing drum 1 of a diameter d of 150 cm, in the illustrated embodiment, and with a length n of 500 cm, is provided, in an end wall 3 which closes off the cylindrical drum wall 2, a feed means 4 for material to be washed, in the form of oil-contaminated or oil-coated mill scale S. The diameter e of the feed means 4 is about 60 cm whereas the diameter t of an inlet 6 provided in the oppositely disposed end wall 5, for a washing lye L, is about 30 cm.

Figure 4:
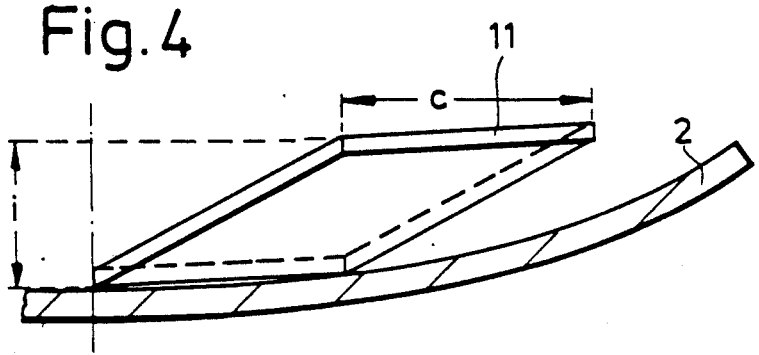
FIG. 4 is a view on an enlarged scale in section through the wall of the drum.

Provided in the interior 10 of the drum are blades 11 whose surface F includes a respective angle $w_1$ and $w_2$ both with respect to a peripheral contour $U_k$ and also a line P which extends on the drum wall in parallel relationship to the axis A of the drum. The length c of the blades 11 is about 150 mm while their width f is then 80 mm. FIG. 4 shows the projected height i (for example 40 mm).

As shown in FIG. 1, a plurality of blades 11 define, on an imaginary line G, a helical line and therefore form a composite spiral or helix. Only some of the blades 11 are shown in the drawing, for the sake of enhanced clarity thereof, but the washing drum 1 has a plurality of spirals or helices therein.

Also for the sake of simplicity of the drawing, the drawing does not show that the blades 11 are adjustable in regard to their angles $w_1$ and $w_2$ in order to be able to adapt the form of that spiral or helix to the respective material to be washed.

The washing drum 1 serves for cleaning oil-bearing mill scale S or aluminium chips or turnings, the oil film on the surface of the metal being washed away in the lye L. The lye L containing the material S to be washed is denoted by Q in the drawing, for the sake of enhanced clarity thereof.. The blades 11 which are inclined in two planes pick up the aluminium chips or turnings S which are disposed in the lower part of the rotating washing drum 11, and lift them on the surface F. The blades 11 are preferably mounted in such a way that a part of the material to be washed, which they engage, drops back over its path of conveying movement as indicated by x, on to the blade 11 which is disposed therebeneath and which is therefore in an upstream position, whereby the path of conveying movement is increased in length.

If the material involved is a material which undergoes only slight oxidation, the chips or turnings S can be lifted above the surface $Q_s$ of the lye and, depending on the inclination of the surface F, drop back on to the next subjacent helix or spiral. When dealing with materials which undergo serious oxidation, the transfer from one blade 11 on to the next following subjacent blade should be carried out beneath the surface $Q_s$ of the lye. The angles of inclination $w_1$ and $w_2$ are dependent in magnitude on the angle of friction or repose of the material S to be cleaned, and the pitch angle z of the helix or spiral. The pitch thereof is in turn dependent on the length n of the washing drum and the speed of rotation thereof, more specifically having regard to the residence time, required for the cleaning process, in respect of the chips or turnings S in the lye Q. The degree of filling of the washing drum 1 is also a factor of significance.

In the illustrated embodiment, the size of the surface F of the blade 11 is 15 cm × 8 cm × 5 cm, with the blades 11 being shown in exaggerated form in the drawing.

In construction shown on the right-hand side in FIG. 5, disposed at the discharge end 5 radially and with an intermediate angle of 60° are feed portions 12 of a length b/c of for example 500 mm, which are adjoined towards the discharge opening 14 by shoe or skid channels 13. The left-hand half of FIG. 5 shows a particularly preferred embodiment with a discharge channel 15 and discharge portions 16 which form tangents to a construction circle 17; the diameter g thereof is between the diameter h of the opening 14 and the diameter of the drum shaft 9. By virtue of that arrangement, material to be washed which is picked up only slides off the discharge portion 16 above the straight horizontal line H.

Illustrated in diagrammatic form beneath the surface $Q_s$ of the lye is a nozzle assembly 40 having bores 41 from which the washing lye is sprayed against the end wall 5. By virtue of the pressure of the feed of washing lye, a zone which is free of residues is produced in the washing lye which is already present, at the surface $Q_s$; the material to be washed can be lifted without interference through the above-mentioned residue-free zone.

Figure 6:
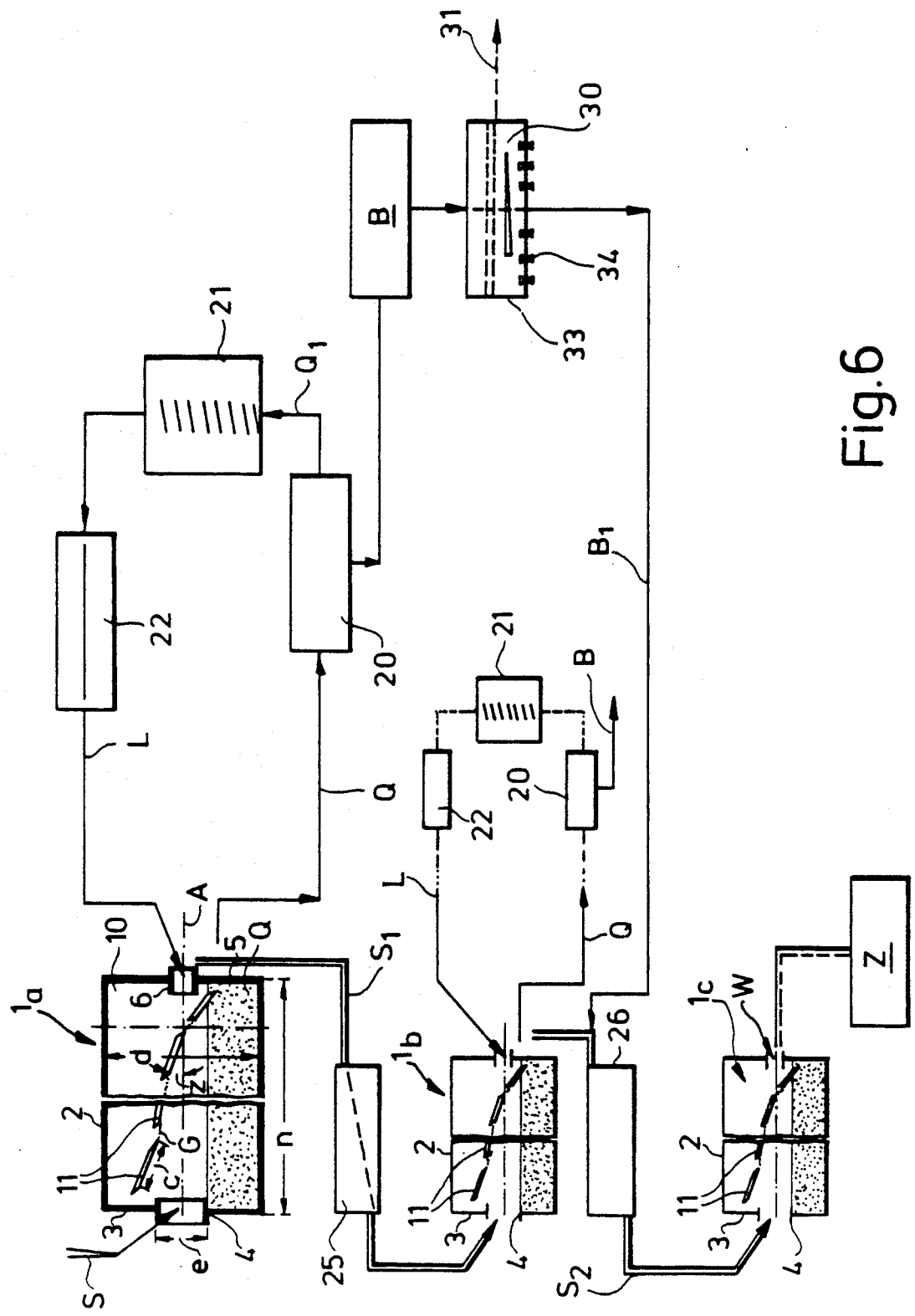
FIG. 6 is a process diagram for a cleaning operation.

The alkaline washing lye Q comprises in particular silicates and non-ionogenic surface active agents and, as shown in FIG. 6, is fed from the first washing drum $1_a$ to a decanter 20 whose deposit or sediment, overflow $Q_1$, passes into a separator 21 and from there goes back to the washing drum 1a through a heat exchanger 22, as the lye L. An evaporation station (not shown in the drawing) can be provided instead of the heat exchanger 22 or in addition.

According to the invention, the speed of rotation of the decanter 20 is such that the adhesion of the oil from the material S to be washed, that is to say, the surface of the mill scale, is greater than the centrifugal force so that the oil is for the major part discharged with the solid matter.

The material $S_1$ to be washed, after leaving the first washing drum $1_a$, is passed by way of a dewatering channel 25 to a second washing drum $1_b$ which in turn is connected to a lye circuit, as was described with respect to the washing drum $1_a$.

After the washing drum $1_b$, the material $S_2$ to be washed again passes through a dewatering channel 25 or a chamber-type filter press 26 and then passes into a washing drum $1_c$ which is operated with clear water. That drum performs a liquid exchange operation so that purified or cleaned product Z issues from the washing drum $1_c$.

Upstream of the washing drum $1_c$, a slurry-like material $B_1$ is introduced into the material $S_2$; the material $B_1$ is the residue from the decanter sediment or deposit B which has been substantially freed from the oil drawn off at 31, in a stirrer 30.

Provided in the container 33 of the stirrer 30, in the bottom region, are air nozzles 34 which are selectively supplied with washing lye or air.

When the stirrer is shut off and the feed of slurry B from the decanter 20 is interrupted, the rising air bubbles entrain the oil, which permits rapid removal of the oil.

After some time, the feed of air is also interrupted so that the oil can be drawn from the surface of the suspension in the container 33.

The slurry which is deposited at the bottom of the container 33 is swirled up again by means of the stirrer 30.

When the stirrer 30 is in operation, the feed of lye is shut off and air is blown in again. The oil which has risen up through the slurry is in turn removed by being sucked away. That operation is controlled in dependence on the respective oil content. When the oil has been substantially removed from the discharge B which is to be treated here, it, together with the material S to be washed, is passed from the second washing drum $1_b$ to the filter press 25.

The oil obtained (outlet 31) is so treated that it can be resold. Essentially, that involves separation of the oil from residual lye and matter in a state of suspension.

I claim:

1. A process for treating oil-contaminated debris comprising the steps of:
   providing a drum rotatable about an axis, said drum being provided with a sidewall and opposed end walls, said opposed endwalls each having an inlet and said sidewall being provided with means for lifting the oil-contaminated debris being treated;
   rotating said drum about said drum axis;
   feeding said oil-contaminated debris through the inlet in one of said opposed endwalls;
   feeding a lye washing solution having a pH of between 10 to 14 through the inlet in the other of said opposed endwalls such that said lye washing solution flows counter-current to the flow of said oil-contaminated debris and said debris is lifted by said means for lifting as said lye flows counter-current to said debris; and
   passing said lye washing solution from said drum over a decanter wherein fines of said debris is separated from the lye.

2. A process according to claim 1 including mixing said lye washing solution with about 2% caustic soda.

3. A process accordingly to claim 1 wherein said lye washing solution is phosphate- and carbon-free.

4. A process according to claim 1 including buffering said lye washing solution with potassium silicate or sodium silicate during the washing operation.

5. A process according to claim 1 including dewatering after the washing operation of said debris and thereafter rewashing said debris between the washing operations.

6. A process according to claim 1 including adjusting said lye to the lyes original concentration and recycling said lye to said drum.

7. A process according to claim 1 including removing slurry-like deposit from the decanter.

8. A process according to claim 7 including dewatering the deposite from the decanter with a material discharged from the washing drum.

* * * * *